Figure 1:
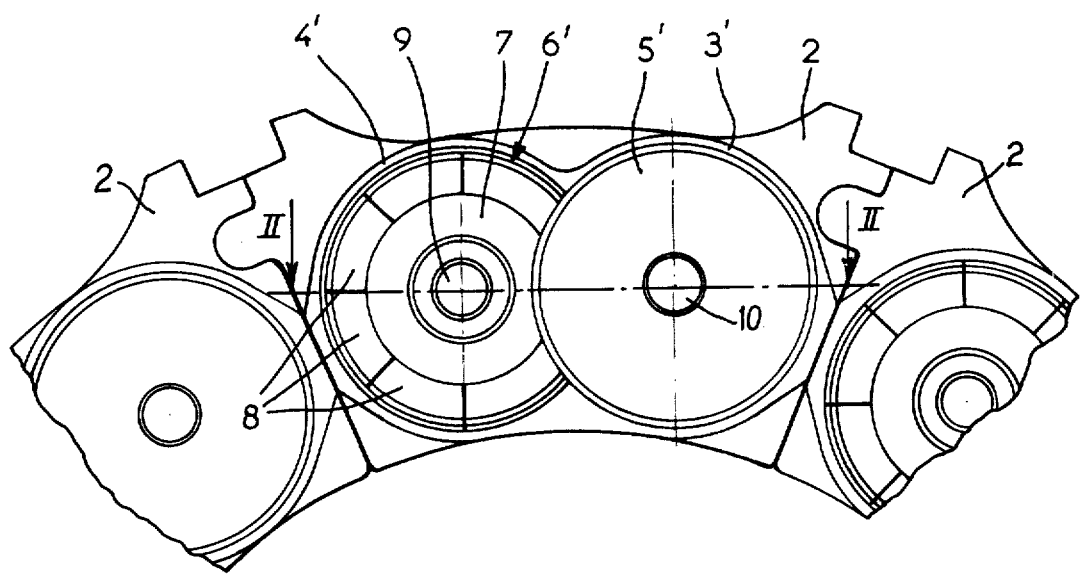

United States Patent

Lucien et al.

[11] 3,923,128
[45] Dec. 2, 1975

[54] DISC BRAKE WITH GRAPHITE FRICTION SHOES

[75] Inventors: Rene Lucien, Neuilly-sur-Seine; Jean Masclet, Paris, both of France

[73] Assignee: Messier Hispano, Paris, France

[22] Filed: Feb. 7, 1974

[21] Appl. No.: 440,575

[52] U.S. Cl. ....... 188/251 A; 188/250 B; 192/70.14; 192/107 M
[51] Int. Cl.² ......................................... F16D 69/02
[58] Field of Search ........... 188/251 R, 251 A, 73.1, 188/250 B, 218 XL; 192/107 M, 70.14

[56] References Cited
UNITED STATES PATENTS

| | | | |
|---|---|---|---|
| 2,135,126 | 11/1938 | Harwood | 192/70.14 |
| 3,708,042 | 1/1973 | Krause et al. | 188/218 X L |
| 3,724,614 | 4/1973 | Bender | 188/218 X L |

FOREIGN PATENTS OR APPLICATIONS

| | | | |
|---|---|---|---|
| 2,108,233 | 4/1972 | France | 188/73.1 |
| 2,109,907 | 9/1971 | Germany | 188/251 A |

Primary Examiner—Trygve M. Blix
Assistant Examiner—Edward R. Kazenske
Attorney, Agent, or Firm—Waters, Schwartz & Nissen

[57] ABSTRACT

A disc brake comprising an alternating arrangement of rotors and stators, each including a plurality of sectors. Each sector is provided with sockets with graphite friction shoes fixed therein, at least two portions of at least two shoes, belonging respectively to an adjacent rotor and stator, comprising roughening elements distributed in such portions that when the rotors rotate, the roughening elements rub on the surface of the shoes of the rotor and stator. The roughening elements are arranged as subdivided elements in the form of a succession of adjacent segments in ring array. The ring of roughening elements is accommodated within the same socket as its respective shoe.

6 Claims, 3 Drawing Figures

DISC BRAKE WITH GRAPHITE FRICTION SHOES

The invention relates to a disc brake with graphite friction shoes.

A disc brake is known from French Pat. No. 2,108,233, comprising an alternating arrangement of rotors and stators, each formed by a ring of sectors provided with sockets with graphite shoes fixed in them, the shoes being used both as friction linings and as a heat well capable of absorbing the energy resulting from the friction.

Experiments have shown that in a disc brake of this type a polishing (glazing) of the rubbing surfaces of the friction linings of the rotors and stators usually takes place when the brake is operated at low temperatures of around 250°C, that is to say, when there is little energy to absorb. This polishing of the friction surfaces results in a lowering of the braking torque and a consequent feeling of spongy braking. This behavior may very well occur where there are graphite discs.

The invention avoids this drawback by providing a disc brake of the above-mentioned type, which is characterized in that at least two portions of at least two shoes, belonging respectively to an adjacent rotor and stator, comprise roughening elements which are distributed in such a way that, when the rotors rotate, the roughening elements rub over the whole surface of the shoes of the rotor and stator.

One feature of the invention is that the roughening elements are made of a graphite different from the graphite of the shoes. By way of example, in a disc brake where the shoes are made of a graphite which has been formed at 2800°C and purified, the roughening elements are made of a carbon which has been formed at 1200°C.

Thus the friction surfaces of the shoes are permanently renovated by the roughening elements and retain a surface condition which is favorable to obtaining a good coefficient of friction.

However, the material which makes up the roughening elements generally has the disadvantage of having much lower thermal conductivity than the graphite forming the shoes. It is consequently sensitive to the thermal shocks which occur in the braking process and is therefore brittle.

Another feature of the invention is accordingly that the roughening elements are made in subdivided form.

In a particular embodiment of the invention, each roughening element comprises a ring which is concentric with a shoe and divided into a succession of adjacent sectors, the ring being accommodated inside the same socket as the shoe.

Figure 2:
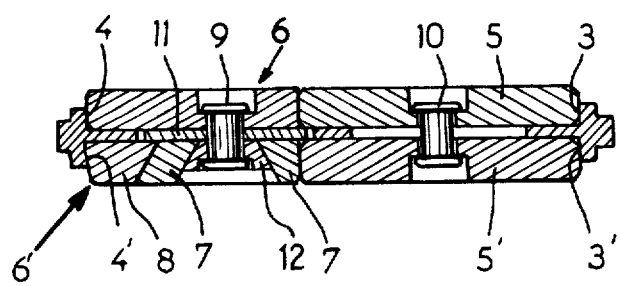
Figure 3:
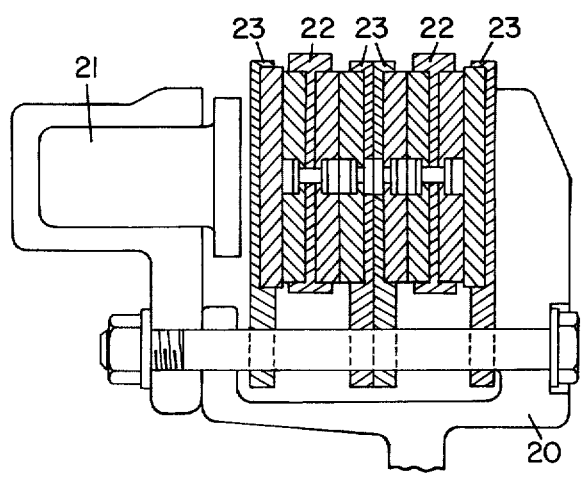

A special embodiment of the disc brake according to the invention will now be described, as a non-restrictive example, with reference to the accompanying drawings, in which:

FIG. 1 is an elevation view of one of the sectors forming a rotor or a stator of the disc brake, and FIG. 2 is a sectional view taken on line II—II in FIG. 1, and FIG. 3 is a diagrammatic radial section taken through the axis of rotation of a disc brake.

Referring to FIG. 3 of the drawings, therein is diagrammatically shown a section through a disc brake. The disc brake includes a housing 20 supporting hydraulic cylinders 21 (only one is shown) for application of braking pressure to a series of brake shoes including alternating rotors 22 and stators 23. Each of the rotors and stators comprises an assembly of a plurality of successive angular sectors as evident from FIG. 1. Each of the sectors has a frame 2 which may be made of metal or graphite and which is provided on each face with a socket with two rims or lobes 3, 4 and 3', 4'. In the rims 3, 4 of the socket formed on one face there are inserted, respectively, a shoe 5 in the form of a complete flat cylinder and a shoe 6 shaped as a lunula with the cut-out part fitting around the periphery of the shoe 5. In the rims 3', 4' of the other face there are inserted the shoes 5' and 6', which are respectively of the same general shape as the shoes 5 and 6.

In accordance with the invention, the shoe 6' comprises a central disc 7 in one piece and a concentric ring which is subdivided into a plurality of segments 8 and made of a special graphite designed to "deglaze" the friction surfaces.

In the example illustrated, the shoes 5, 5' are fixed on the frame 2 by means of a rivet 10. The shoe 6, the central disc 7 and the segments 8 are assembled by a rivet 9, a common supporting collar 11 and a conical collar 12. For this purpose the central disc 7 contains a central hole of a frustoconical shape complementary with that of the conical collar 12. The adjoining walls of the central disc and of the sectors 8 similarly have a complementary frustoconical shape. This construction enables the rivet 9 to hold the shoe 6, the central disc 7, all the sectors 8 and the collar 12 in position.

The shoes 5, 5', 6 and the central disc 7 are made of graphite which has been formed at 2800°C, while the fragmentary sectors 8 may be made of carbon which has been formed at 1200°C. Under these conditions the heat conductivity of the carbon is much lower than that of the graphite, but because of their divided structure the elements 8 correctly tolerate the thermal shocks which they receive in the braking process.

The roughening elements can obviously be mounted in a plurality of sockets belonging to a plurality of rotors and/or stators, but it is essential that roughening elements should be fixed to at least one shoe of a rotor and to at least one shoe of the adjacent stator.

We claim:

1. A disc brake comprising an alternating arrangement of rotors and stators, each including a plurality of sectors, each sector being provided with sockets with graphite friction shoes fixed in said sockets, at least one portion of each of an adjacent rotor and stator comprising roughening elements distributed in said portion such that when the rotors rotate, said roughening elements rub on the surface of the shoe in the adjacent confronting socket, said roughening elements comprising a plurality of separate elements respectively accomodated with its associated shoe in a common respective socket, said plurality of separate elements being arrayed at least as a portion of a ring which is concentric with its respective shoe and attachment means securing said plurality of separate elements and said associated shoe within said common socket in secured relation therein.

2. A disc brake according to claim 1, wherein the shoes are made of a graphite which has been formed at 2800°C and purified, and the roughening elements are made of a carbon which has been formed at 1200°C.

3. A disc brake as claimed in claim 1 wherein said attachment means comprises a rivet.

4. A disc brake comprising an alternating arrangement of rotors and stators, each including a plurality of sectors, each sector being provided with sockets with graphite friction shoes fixed in said sockets, at least one portion of each shoe of an adjacent rotor and stator comprising roughening elements distributed in said portion such that when the rotors rotate, said roughening elements rub on the surface of the shoes of said rotor and stator, said roughening elements being constituted of a graphite material which is different from the graphite material of the shoes, each roughening element comprising a ring concentric with its respective shoe and subdivided into a succession of adjacent segments, said ring being accommodated within the same socket as its respective shoe.

5. A disc brake according to claim 4, comprising a central disc in the socket with said ring and serving as said shoe, said disc being provided with a hole having a frustoconical wall and with external lateral walls of frustoconical shape, a conical collar of complementary shape fitted into said hole, said segments of the ring of the roughening element being disposed at the periphery of the central disc, each being provided with an internal lateral wall of frustoconical shape, complementary with that of the external lateral walls of the central disc, and a rivet securing said central disc, said roughening elements and said conical collar in the associated socket, said rivet passing through the conical collar and the respective sector in which the socket is formed.

6. A disc brake comprising an alternating arrangement of rotors and stators, each including a plurality of sectors, each sector being provided with sockets with graphite friction shoes fixed in said sockets, at least one portion of each shoe of an adjacent rotor and stator comprising roughening elements distributed in said portion such that when the rotors rotate, said roughening elements rub on the surface of the shoes of said rotor and stator, said roughening elements being constituted of a graphite material which is different from the graphite material of the shoes, a central disc in the socket with the roughening elements and serving as the shoe in this socket, said disc being provided with a hole having a frustoconical wall and with external lateral walls of frustoconical shape, a conical collar of complementary shape fitted into said hole, said roughening elements being disposed at the periphery of the central disc and each being provided with an internal lateral wall of frustoconical shape, complementary with that of the external lateral walls of the central disc, and a rivet securing the central disc, said roughening elements and said conical collar in the associated socket, said rivet passing through the conical collar and the respective sector in which the socket is formed.

* * * * *